(12) United States Patent
Trimberger

(10) Patent No.: US 7,716,497 B1
(45) Date of Patent: May 11, 2010

(54) BITSTREAM PROTECTION WITHOUT KEY STORAGE

(75) Inventor: Stephen M. Trimberger, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 1108 days.

(21) Appl. No.: 11/151,985

(22) Filed: Jun. 14, 2005

(51) Int. Cl.
*G06F 11/30* (2006.01)
*G06F 12/14* (2006.01)

(52) U.S. Cl. .................... 713/193; 726/9; 713/176; 713/185; 365/186

(58) Field of Classification Search ................ 713/193
See application file for complete search history.

(56) References Cited

U.S. PATENT DOCUMENTS

| | | | |
|---|---|---|---|
| 5,970,142 A | 10/1999 | Erickson | |
| 6,101,624 A | 8/2000 | Cheng et al. | |
| 6,351,814 B1 | 2/2002 | Batinic et al. | |
| 6,356,637 B1 | 3/2002 | Garnett | |
| 6,438,065 B1 * | 8/2002 | Rao et al. | 365/189.15 |
| 6,604,214 B1 | 8/2003 | Fukushima | |
| 6,785,816 B1 * | 8/2004 | Kivimaki et al. | 713/181 |
| 6,791,353 B1 | 9/2004 | Beal et al. | |
| 2001/0016920 A1 | 8/2001 | Chan | |
| 2001/0032318 A1 | 10/2001 | Yip et al. | |
| 2001/0037458 A1 | 11/2001 | Kean | |
| 2002/0018561 A1 | 2/2002 | Emeiko | |
| 2008/0270805 A1 * | 10/2008 | Kean | 713/189 |

OTHER PUBLICATIONS

U.S. Appl. No. 09/950,420, filed Sep. 10, 2001, Trimberger.
Ajluni, Give Your IP a Unique ID with Silicon Fingerprinting, Feb. 7, 2000, Electronic Design, ED Online ID#1122.

* cited by examiner

*Primary Examiner*—Nasser Moazzami
*Assistant Examiner*—Fikremanam Yalew
(74) *Attorney, Agent, or Firm*—William L. Paradice, III; John J. King

(57) ABSTRACT

An external storage device may transmit encrypted configuration data to a PLD during a configuration operation without transmitting the encryption key to the PLD and without retaining decryption information in the PLD. During a set-up operation, the encryption key is provided to the PLD, which generates an ID code upon power-up. The PLD generates a correction word in response to the encryption key and the ID code. The correction word is output from the PLD, which is powered-down, and is stored with the encrypted configuration data in the storage device. Then, during a configuration operation, the PLD is powered-on and re-generates the ID code. The correction word and the encrypted configuration data are transmitted to the PLD, which generates a decryption key in response to the re-generated ID code and the correction word.

19 Claims, 3 Drawing Sheets

BITSTREAM PROTECTION WITHOUT KEY STORAGE

FIELD OF INVENTION

This invention relates generally to programmable logic devices, and in particular to securely transmitting configuration data to a programmable logic device.

DESCRIPTION OF RELATED ART

A programmable logic device (PLD) is a well-known general-purpose device that can be programmed by a user to implement a variety of selected functions. PLDs are becoming increasingly popular with circuit designers because they are less expensive, more flexible, and require less time to implement a particular user design than custom-designed integrated circuits such as Application Specific Integrated Circuits (ASICs).

There are many types of PLDs such as field programmable gate arrays (FPGAs) and complex PLDs (CPLDs). For example, an FPGA typically includes an array of configurable logic blocks (CLBs), a plurality of input/output blocks (IOBs), and block RAM elements selectively connected to each other by a programmable interconnect structure. The CLBs are individually programmable and can be configured to perform a variety of logic functions. The IOBs are selectively connected to various I/O pins of the FPGA, and can be configured as either input buffers or output buffers. The block RAM elements can store data during operation of the FPGA and/or can be configured to implement various functions such as FIFO memories and state machines. The various functions and signal interconnections implemented by the CLBs, IOBs, the block RAM elements, and the programmable interconnect structure are controlled by a number of corresponding configuration memory cells that store configuration data embodying a desired user design.

Typically, a user captures a circuit design using any of several design capture tools. The user then uses software tools to convert the captured design into a device specific bitwise representation. The bitwise representation is typically stored in a storage device external to the PLD. Upon power-on of the PLD, the storage device supplies the bitwise representation to the PLD, which uses configuration data contained in the bitwise representation to configure the PLD's configurable logic elements to implement the desired user design.

By the time the bitwise representation is created, significant amounts of time and effort have been expended. Thus, to encourage research and development of new circuit designs, it is desirable to protect the circuit design embodied by the configuration data from illegal copying and/or use. To prevent unauthorized persons from copying the configuration data from the external storage device, which could then be used to configure other PLD's with a user's design, the configuration data may be encrypted before it is stored in the storage device, transmitted from the storage device to the PLD in its encrypted form, and then decrypted in the PLD using a decryption key. Typically, the decryption key is a factory-programmed, fixed key that is hardwired or otherwise permanently stored into the PLD. However, using the same decryption key for a large number of PLDs may be problematic because an unauthorized copier need only buy a designer's product, copy the encrypted bitstream, and buy a PLD that has the desired key. Thereafter, the product can be easily replicated using purchased PLDs without breaking the encryption code.

To improve security, some manufacturers allow each of their PLDs to use a different decryption key to decrypt encrypted configuration data provided to the PLD during PLD configuration operations. However, programming each PLD with a different decryption key requires a customer to use different encryption keys to encrypt the configuration data associated with different PLDs, even when the customer desires to program a large number of PLDs with the same configuration data, which is a time consuming process unattractive to many customers.

Further, to store a different decryption key in each PLD, the PLD must include some form of non-volatile memory element capable of retaining the decryption key during times when the PLD is not powered-on. Thus, as known in the art, some PLDs may include a non-volatile semiconductor memory (e.g., a PROM, EPROM, EEPROM, or flash memory), a volatile memory (e.g., SRAM or DRAM cells) having an associated back-up battery supply, or a number of fuses to retain the decryption key when the PLD is not powered-on. However, including non-volatile memory elements in the PLD to retain the decryption key during times when the PLD is not powered-on is undesirable, for example, as described below.

First, because non-volatile semiconductor memories (e.g., PROM, EPROM, EEPROM, and flash memory devices) are more complex and more difficult to implement than the circuitry typically used to implement the PLD's configurable logic elements, IC devices that do not include such non-volatile semiconductor memories may be implemented using newer (e.g., smaller geometry) process technologies more quickly than IC devices that include such non-volatile semiconductor memories. Thus, providing a non-volatile semiconductor memory within a PLD to store the decryption key may undesirably delay migration of the PLD to newer process technologies, which in turn may result in a competitive disadvantage.

Second, many customers are wary of relying upon a battery to retain the decryption key in a PLD's volatile memory when the PLD is not powered-on. For example, if the battery becomes disconnected from the PLD's volatile memory and/or fails when the PLD is not powered-on (e.g. while in storage waiting to be deployed in the customer's products), the PLD's decryption key may be lost and thereby prevent the PLD from being able to decrypt an encrypted configuration bitstream provided thereto.

Third, using fuses to store the decryption key in a PLD may consume a significant amount of silicon area. Further, because fuses typically do not scale well with new process technologies, migration to smaller geometry process technologies may not decrease the circuit area consumed by the fuses. In addition, because an illegal copier may be able to obtain the PLD's decryption key with relative ease by using a microscope to ascertain the contents stored in the fuses, using fuses to store a PLD's decryption key presents security risks that may be unacceptable to some customers.

Therefore, there is a need for a more secure technique of protecting proprietary data used to configure PLDs without using non-volatile memory elements in the PLD for storing encryption/decryption information while allowing a customer to use the same encryption key to encrypt configuration data for a plurality of PLDs that may be configured to generate different ID codes.

SUMMARY

A method and apparatus are disclosed that allow an external storage device to transmit configuration data encrypted with an encryption key to an integrated circuit (IC) such as a programmable logic device (PLD) without transmitting the encryption key to the IC during configuration operations and without retaining decryption information in the IC when the IC is not powered-on, but yet allow a customer to use the same encryption key to encrypt the configuration data for a plurality of ICs that generate different ID codes used to the decrypt the encrypted configuration data.

In accordance with the present invention, a system is disclosed that includes an IC, an external storage device. The external storage device stores data that includes configuration data encrypted with an encryption key that may be selected by a customer, and for some embodiments also stores a correction word. The correction word, which indicates a logical relationship between the encryption key and an identification (ID) code of the IC, allows the customer to use the same encryption key to encrypt configuration data for a plurality of ICs that generate different ID codes.

In accordance with the present invention, an encryption key, which may be selected by the customer and is used to encrypt the customer's configuration data, is transmitted to the IC, for example, by an external controller upon authentication by the IC. Correction word logic generates the correction word in response to the ID code and the encryption key. The correction word and the encrypted configuration data may then be stored in the external storage device, for example, as a configuration bitstream.

Thereafter, ID code logic may re-generate the ID code, which is provided to decryption logic. A configuration bitstream including the correction word and the encrypted configuration data is transmitted from the external storage device to the IC. The decryption logic generates a decryption key in response to the re-generated ID code and the correction word, and decrypts the encrypted configuration data using the decryption key to recover the original, unencrypted configuration data.

In accordance with some embodiments of the present invention, the IC does not include any storage elements capable of retaining the ID code, the correction word, and/or the encryption key when power is removed from the IC, and therefore does not suffer from the aforementioned disadvantages of prior ICs that include non-volatile semiconductor memories, battery-backed volatile memories, and/or fuses to store encryption and/or decryption information. Further, because the encryption key used to encrypt the configuration data is not stored in the external memory device, an unauthorized user cannot ascertain the encryption key by reading data from the external storage device or by intercepting the bitstream transmitted to the IC during configuration operations. In addition, by providing a correction word that indicates the logical relationship between the encryption key and the IC's ID code to the IC, embodiments of the present invention allow a customer to use the same encryption key to encrypt configuration data for a plurality of ICs that generate different ID codes.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Embodiments of the present invention are described below with respect to an FPGA and configuration data for an FPGA for simplicity only. It is to be understood that embodiments of the present invention are equally applicable to other programmable or configurable devices such as complex PLDs and other programmable logic devices, and to other integrated circuit (IC) devices such as application-specific integrated circuit (ASIC) devices, and are equally applicable to other types of proprietary data. For some embodiments, the FPGA described below may be implemented within or as part of an ASIC device. In the following description, for purposes of explanation, specific nomenclature is set forth to provide a thorough understanding of the present invention. In other instances, well-known circuits and devices are shown in block diagram form to avoid obscuring the present invention. Further, the logic levels assigned to various signals in the description below are arbitrary, and thus may be modified (e.g., reversed polarity) as desired. Accordingly, the present invention is not to be construed as limited to specific examples described herein but rather includes within its scope all embodiments defined by the appended claims.

In accordance with the present invention, separate set-up and configuration operations may be used to securely transmit configuration data to a semiconductor device such as an FPGA. For example, during the set-up operation, an encryption key which is used to encrypt a customer's configuration data is sent to the FPGA. In response thereto, the FPGA generates an identification (ID) code unique to the FPGA, and logically combines the ID code with the encryption key to generate a correction word. The correction word, which is also unique to the FPGA and indicates the logical relationship between the FPGA's ID code and the encryption key, is then output from the FPGA and stored, along with the encrypted configuration data, in an external storage device associated with the FPGA. When the FPGA is powered-down, for example, after the set-up operation, the FPGA does not retain the ID code, the correction word, or the encryption key. Thereafter, during the configuration operation, the FPGA re-generates the ID code, and the correction word and the encrypted configuration data are transmitted to the FPGA from the external storage device. The FPGA generates a decryption key in response to the re-generated ID code and the correction word, and decrypts the encrypted configuration data using the decryption key to recover the original, unencrypted configuration data. Then, the FPGA's configurable logic elements may be configured using the unencrypted configuration data in a well-known manner.

Figure 1:
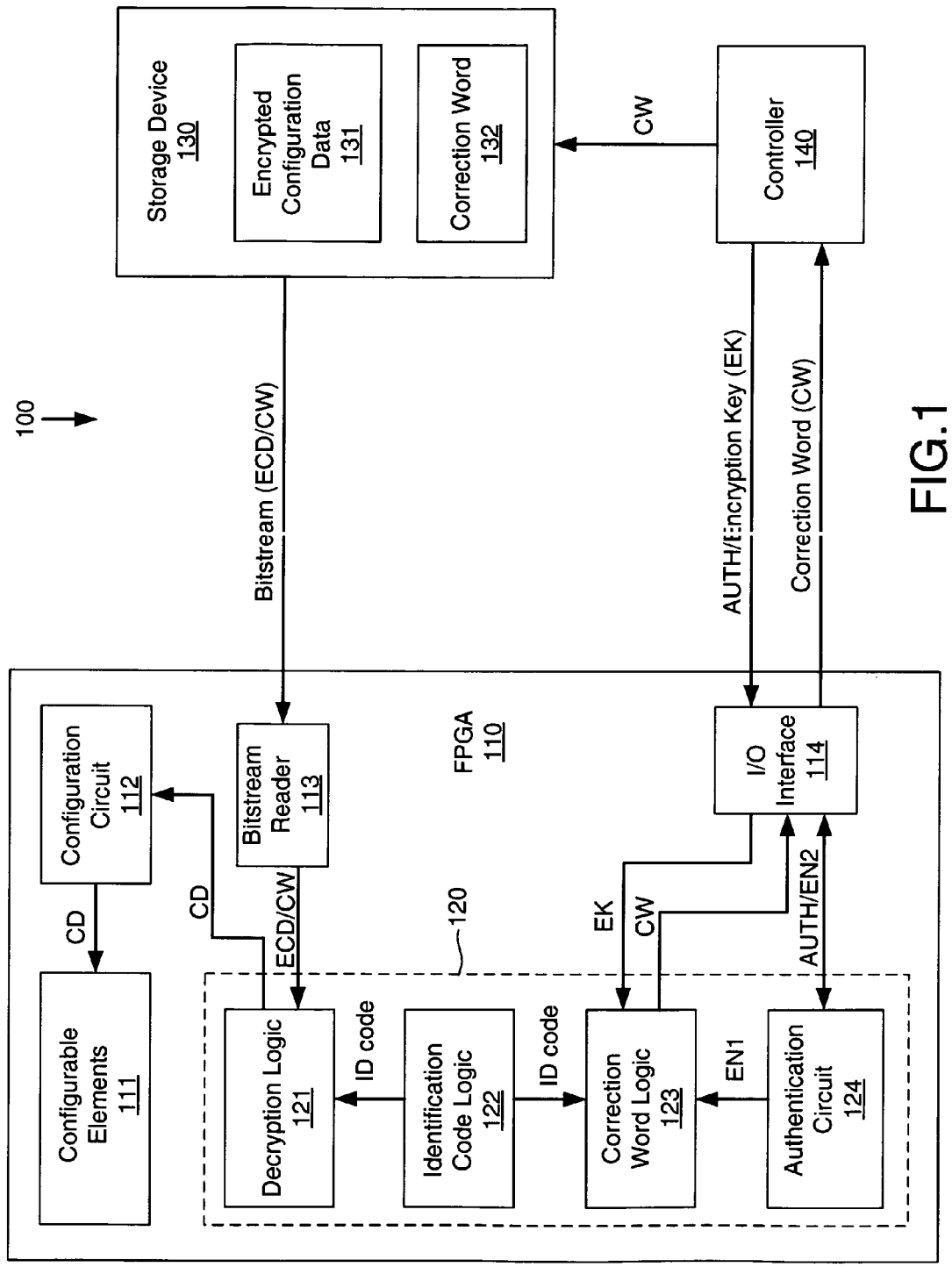
FIG. 1 is a block diagram of a system for securely transmitting configuration data from an external storage device to an FPGA in accordance with some embodiments of the present invention.

FIG. 1 is a block diagram of a system 100 in accordance with some embodiments of the present invention. System 100 includes an FPGA 110, an external storage device 130, and an external controller 140. FPGA 110 includes a plurality of configurable elements 111, a configuration circuit 112, a bitstream reader 113, an I/O interface 114, and a security circuit 120. For some embodiments, configuration circuit 112, bitstream reader 113, I/O interface 114, and security circuit 120 may be implemented using dedicated circuitry that is capable of being initialized to operational states upon power-up of FPGA 110, for example, without having to be programmed with externally supplied data.

Configurable elements 111 are generally representative of various well-known configurable resources such as, for example, the CLBs, IOBs, block RAMs, hard and soft processors, multipliers, transceivers, DSP blocks, clocking resources, and/or the programmable interconnect structure typically provided within programmable devices such as FPGA 110. Configuration circuit 112, which is well-known, may be used to program configurable elements 111 with configuration data to implement a user design embodied by the configuration data. Bitstream reader 113, which is well-known, may be used to receive data (e.g., a bitstream including encrypted configuration data and a correction word) from external storage device 130 during configuration of the FPGA. Although bitstream reader 113 is depicted in the exemplary embodiment of FIG. 1 as separate from configuration circuit 112, for other embodiments, bitstream reader 113 may be included within configuration circuit 112. The general architecture and operation of configurable elements 111, configuration circuit 112, and bitstream reader 113 are well-known, and thus are not described in further detail herein for simplicity.

I/O interface 114, which may be implemented using well-known circuit techniques, may be used to facilitate communication between the FPGA's security circuit 120 and external controller 140, for example, during set-up operations. For some embodiments, I/O interface 114 may be a well-known JTAG-compliant test circuit (not shown in FIG. 1 for simplicity) provided within FPGA 110. As known in the art, JTAG test circuitry may be used to test various resources of FPGA 110, and may also be used to access various FPGA resources prior to configuration of the FPGA using well-known JTAG commands. The architecture and operation of JTAG-compliant test circuitry are well-known, and therefore are not described in detail herein for simplicity. For other embodiments, I/O interface 114 may be implemented using well-known circuitry other than JTAG-compliant test circuitry.

Security circuit 120 includes decryption logic 121, identification (ID) code logic 122, correction word logic 123, and an authentication circuit 124. Decryption logic 121 is coupled to configuration circuit 112, to bitstream reader 113, and to ID code logic 122. Decryption logic 121, which may be implemented using well-known circuitry, uses a decryption key to decrypt encrypted configuration data provided to FPGA 110 during configuration operations. ID code logic 122, which is coupled to decryption logic 121 and to correction word logic 123, may utilize well-known circuitry to generate an ID code that is unique to FPGA 110. The ID code may be generated using a silicon fingerprint that is unique to FPGA 110. For some embodiments, ID code logic 122 generates the same ID code upon each power-on of FPGA 110. In some embodiments, the ID code generated may not be unique, but ID code logic 122 may instead have an acceptably low probability of generating an ID code that is identical to an ID code generated by ID code logic of a different FPGA.

For some embodiments, ID code logic 122 may employ a well-known technique licensed by SiidTech Inc. that generates each bit of the ID code in response to threshold voltage differences between corresponding pairs of transistors provided in a silicon ID circuit (not shown in FIG. 1 for simplicity) that may be provided within FPGA 110. As known in the art, the SiidTech technique relies upon statistical process variations inherent in the fabrication of the transistor pairs to generate an ID code that is unique to each FPGA.

However, because a transistor's threshold voltage is somewhat dependent upon operating temperature and the device's supply voltage, unpredictable variations in operating temperature and/or in the device's supply voltage may sufficiently alter the threshold voltage of one or more of the transistor pairs so that the ID code generated upon power-on of the FPGA may not always be the same, which may undesirably prevent the FPGA 110 from properly decrypting the encrypted configuration data. Thus, for such embodiments, the FPGA's security circuit 120 may employ a correction technique that compensates for undesirable changes in the ID code resulting from variations in operating temperature and/or in the device's supply voltage, for example, as described in commonly-owned and co-pending U.S. patent application Ser. No. 09/950,420, entitled "System and Method for using a PLD Identification Code," filed Sep. 10, 2001, by Stephen M. Trimberger which is incorporated by reference herein.

Of course, for other embodiments, ID code logic 122 may generate a unique ID code for FPGA 110 using other suitable techniques.

Correction word logic 123, which is coupled to ID code logic 122. to authentication circuit 124, and to I/O interface 114, generates the correction word (CW) in response to the ID code generated by ID code logic 122 and an encryption key (EK) that is used to encrypt configuration data associated with FPGA 110. Correction word logic 123 may employ any suitable logic elements to generate the correction word as a logical combination of the ID code and the encryption key. In this manner, the correction word, which is also unique to the FPGA, indicates the logical relationship between the FPGA's unique ID code and the encryption key selected to encrypt the FPGA's configuration data. For some embodiments, correction word logic 123 generates the correction word as an exclusive-OR (XOR) logic function of the ID code and the encryption key. In such embodiments, the encryption key may be recovered by a second XOR operation on the ID code and the correction word. Of course, for other embodiments, correction word logic 123 may use other suitable logic functions to generate the correction word in response to the ID code and the encryption key. For example, for another embodiment, correction word logic 123 may generate the correction word in response to the ID code, the encryption key, and the configuration data.

As explained in more detail below, by utilizing the correction word during set-up and configuration operations of FPGA 110, embodiments of the present invention allow a customer to use the same encryption key to encrypt configuration data for a plurality of devices that generate different ID codes without degrading security of the configuration data, which in turn may advantageously reduce the time required for the customer to configure a large number of devices with various user designs.

Authentication circuit 124, which is coupled to correction word logic 123 and to I/O interface 114, determines whether external circuitry such as external controller 140 is authorized to exchange information with the FPGA's security circuit 120 during the set-up operation. Authentication circuit 124 may utilize any well-known authentication technique to verify that external controller 140 is authorized to communicate with security circuit 120. For some embodiments, if authentication circuit 124 determines that external controller 140 is authorized to communicate with security circuit 120, authentication circuit 124 may enable correction word logic 123 to allow correction word logic 123 to generate the correction word in response to the FPGA's ID code and the user's encryption key, and/or to output the correction word to external controller 140, for example, for subsequent storage in external storage device 130. Otherwise, if authentication circuit 124 determines that external controller 140 is not authorized to communicate with the FPGA's security circuit 120, authentication circuit 124 may disable correction word logic 123 to prevent correction word logic 123 from generating and/or outputting the correction word from FPGA 110, thereby preventing an unauthorized user from obtaining the correction word and/or the ID code from the FPGA.

Storage device 130, which may be any suitable non-volatile storage device (e.g., a PROM, EPROM, EEPROM, flash memory, and the like), stores encrypted configuration data 131 and the correction word 132. The configuration data may be encrypted with the encryption key using DES, CRC, or any other suitable encryption algorithm. Although described in the exemplary embodiments below as providing the encrypted configuration data and the correction word as a bitstream to FPGA 110, storage device 130 may transmit data to FPGA 110 using various well-known configuration modes. For example, the Virtex™ family of programmable logic devices available from Xilinx, Inc., which is the assignee of the present invention, supports serial configuration modes such as the well-known Master-Serial and Slave-Serial modes, and also supports parallel configuration modes such as various well-known SelectMAP™ configuration modes, each of which may be employed by embodiments of FPGA 110.

External controller 140, which may include well-known hardware and/or software components, is configured to selectively communicate with the FPGA upon authentication by the FPGA's security circuit 120, and may be used during the set-up operation to send the encryption key to the FPGA's security circuit 120 and to receive the correction word generated by and output from the FPGA's security circuit 120. For some embodiments, controller 140 may be coupled to external storage device 130 (e.g., as depicted in the exemplary embodiment of FIG. 1) to provide the correction word to storage device 130. For one embodiment, controller 140 may include well-known encryption circuitry that encrypts the configuration data using the encryption key and provides the encrypted configuration data to storage device 130 for storage therein. For other embodiments, other well-known circuitry (not shown in FIG. 1 for simplicity) may be used to encrypt the configuration data using the encryption key and to store the encrypted configuration data in the external storage device.

As mentioned above, the configurable elements 111 of FPGA 110 may be customized to implement a user's design by loading encrypted configuration data into FPGA 110 from external storage device 130. The original configuration data may be generated using well-known FPGA software (not shown for simplicity), such as the ISE Foundation™ software tools, available from Xilinx, Inc. This FPGA software may receive a top-level design provided by a user, wherein the top-level design designates the logic design that will be implemented on the FPGA. For some embodiments, the FPGA software may receive the top-level design in VHDL, Verilog, or in standard schematic form. The FPGA software generates the configuration data that will program an FPGA to provide the functions designated by the top-level design. Because generation of the configuration data typically requires significant investment by a user, it is desired to prevent unauthorized persons from copying the configuration data and then using the copied configuration data to configure unauthorized FPGAs.

As mentioned above, some embodiments of the present invention utilize separate set-up and configuration operations to securely transmit encrypted configuration data to FPGA 110 in a manner that allows a customer to use the same encryption key to encrypt configuration data for a plurality of devices that generate different ID codes without compromising security of the configuration data.

Figure 2:
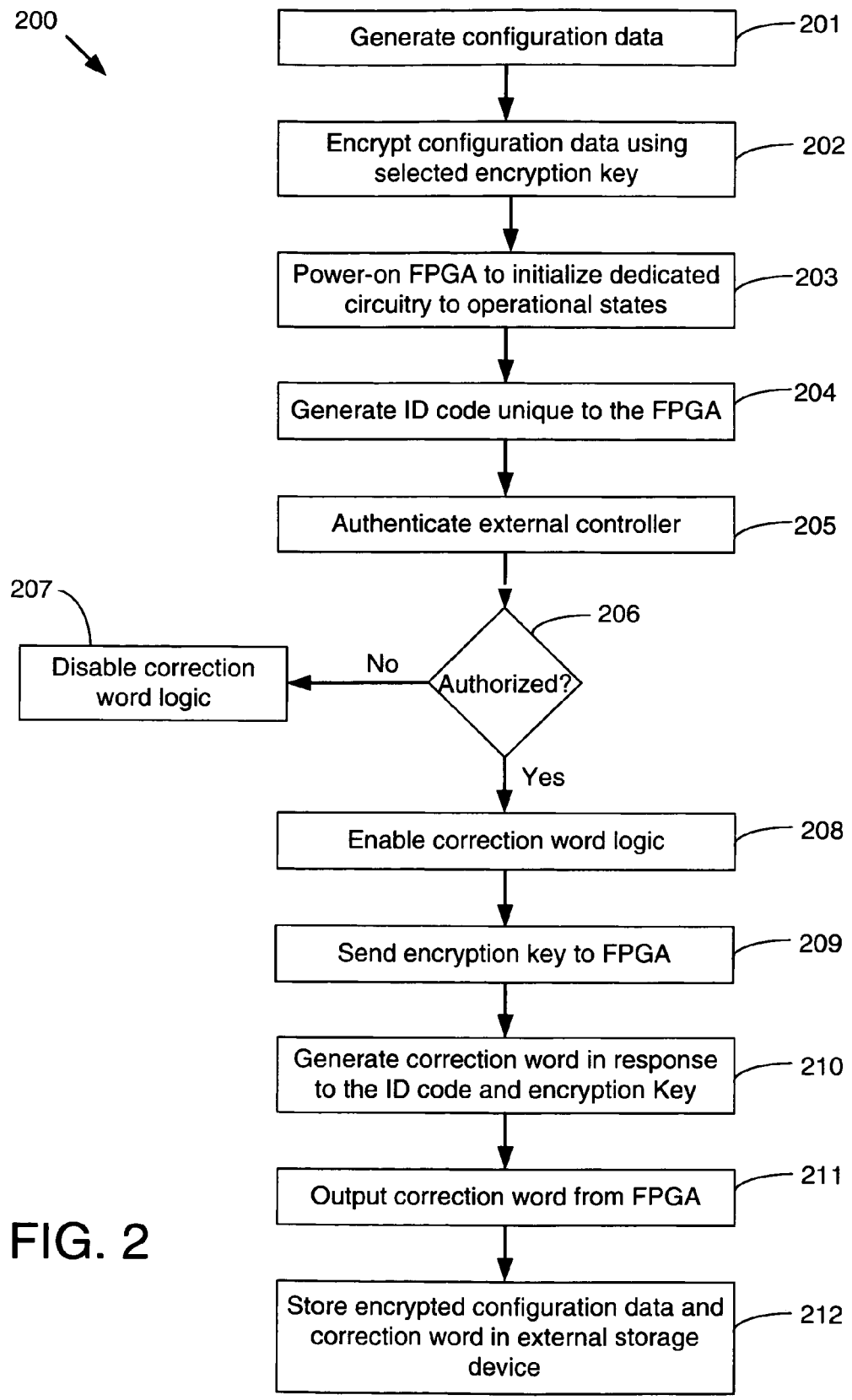
FIG. 2 is an illustrative flow chart depicting an exemplary embodiment of a set-up operation during which the FPGA of FIG. 1 generates a correction word in response to an encryption key and an identification (ID) code generated within and unique to the FPGA.

FIG. 2 is an illustrative flow chart 200 depicting an exemplary embodiment of the set-up operation for generating and obtaining the correction word from FPGA 110 prior to configuration of FPGA 110. After FPGA 110 and associated external storage device 130 are shipped to a customer, the customer uses well-known techniques to generate configuration data that embodies a desired circuit design to be implemented by FPGA 110 (step 201). The customer selects an encryption key and encrypts the configuration data with the selected encryption key using any suitable encryption technique (step 202). The FPGA is powered-on, which initializes the FPGA's dedicated security circuit 120 and its dedicated I/O interface 114 to operational states (step 203). Once the FPGA's security circuit 120 is operational, its ID code logic 122 generates the FPGA's unique ID code and forwards the ID code to correction word logic 123 (step 204).

Then, external controller 140 is authenticated by the FPGA security circuit's authentication circuit 124, for example, to allow external controller 140 to exchange data with FPGA 110 during the set-up operation (step 205). Any suitable technique may be used to authenticate external controller 140 as being authorized to communicate with FPGA 110 during the set-up operation. For some embodiments, external controller 140 may be configured to send an authentication code (AUTH) to authentication circuit 124 via I/O interface 114 (e.g., as depicted in the exemplary embodiment of FIG. 1), and in response thereto authentication circuit 124 determines whether external controller 140 is authorized to communicate with FPGA 110 during the set-up operation. For some embodiments, a suitable public key encryption system may be used for authenticating external controller 140. For other embodiments, other well-known techniques may be used to authenticate external controller 140.

If external controller 140 is not authenticated by the FPGA, as tested at step 206, then authentication circuit 124 may disable correction word logic 123, for example, by de-asserting (e.g., to logic low) a first enable signal (EN1) that prevents correction word logic 123 from generating the correction word, thereby preventing an unauthorized user from obtaining the correction word or the ID code from FPGA 110 (step 207). For some embodiments, authentication circuit 124 may also disable I/O interface 114 from transmitting data to external circuits such as controller 140 by de-asserting (e.g., to logic low) a second enable signal (EN2) provided to I/O interface 114.

Conversely, if external controller 140 is authenticated by the FPGA, as tested at step 206, then authentication circuit 124 may enable correction word logic 123, for example, by asserting (e.g., to logic high) EN1 (step 208). For some embodiments, authentication circuit 124 may also enable I/O interface 114 to exchange data with external controller 140, for example, by asserting (e.g., to logic high) the EN2 signal provided to I/O interface 114. Upon authorization, external controller 140 sends the encryption key to correction word logic 123 via I/O interface 114 (step 209). For some embodiments, the encryption key may be transmitted in encrypted form for increased security. Correction word logic 123 generates the correction word in response to the ID code generated by ID code logic 122 and the encryption key provided by external controller 140 (step 210). For some embodiments, correction word logic 123 generates the correction word as a logical combination (e.g., using the XOR logic function) of the ID code and the encryption key. Of course, for other embodiments, correction word logic 123 may generate the correction word in response to the ID code and the encryption key using other suitable logical functions.

The correction word is then output from FPGA 110 to external controller 140 via I/O interface 114 (step 211). Then, the correction word and the encrypted configuration data are stored in external storage device 130 (step 212). Thereafter, FPGA 110 may be powered-down, and external controller 140 may be disconnected from FPGA 110 and/or from external storage device 130.

For some embodiments, when the FPGA is powered-down (e.g., upon completion of the set-up operation), the FPGA does not retain the ID code, the correction word, or the encryption key. More specifically, because FPGA 110 does not include any non-volatile semiconductor memory elements (e.g., PROM, EPROM, EEPROM, and/or flash memory devices) for storing encryption/decryption information such as the ID code, the correction word, and/or the encryption key, various embodiments of FPGA 110 may be migrated to newer process technologies more quickly than prior FPGAs that include non-volatile semiconductor memory elements for storing such encryption/decryption information. Further, because FPGA 110 does not include any battery-backed volatile memory elements for storing such encryption/decryption information, embodiments of the present invention may alleviate customer concerns regarding the reliability of battery-backed volatile memory elements. In addition, because FPGA 110 does not include fuses for storing such encryption/decryption information, illegal copiers may not be able to obtain such encryption/decryption information from FPGA 110, for example, by using a microscope to ascertain data stored in the fuses.

It is to be understood that the set-up operation described above is exemplary, and thus one or more of the process steps depicted in the illustrative flow chart FIG. 2 may be performed in other suitable orders. For one example, the configuration data may be encrypted with the encryption key and/or stored in the external storage device 130 after the correction word has been read from the FPGA. For other embodiments, the set-up operation may not include the authentication process associated with steps 205-208.

Figure 3:
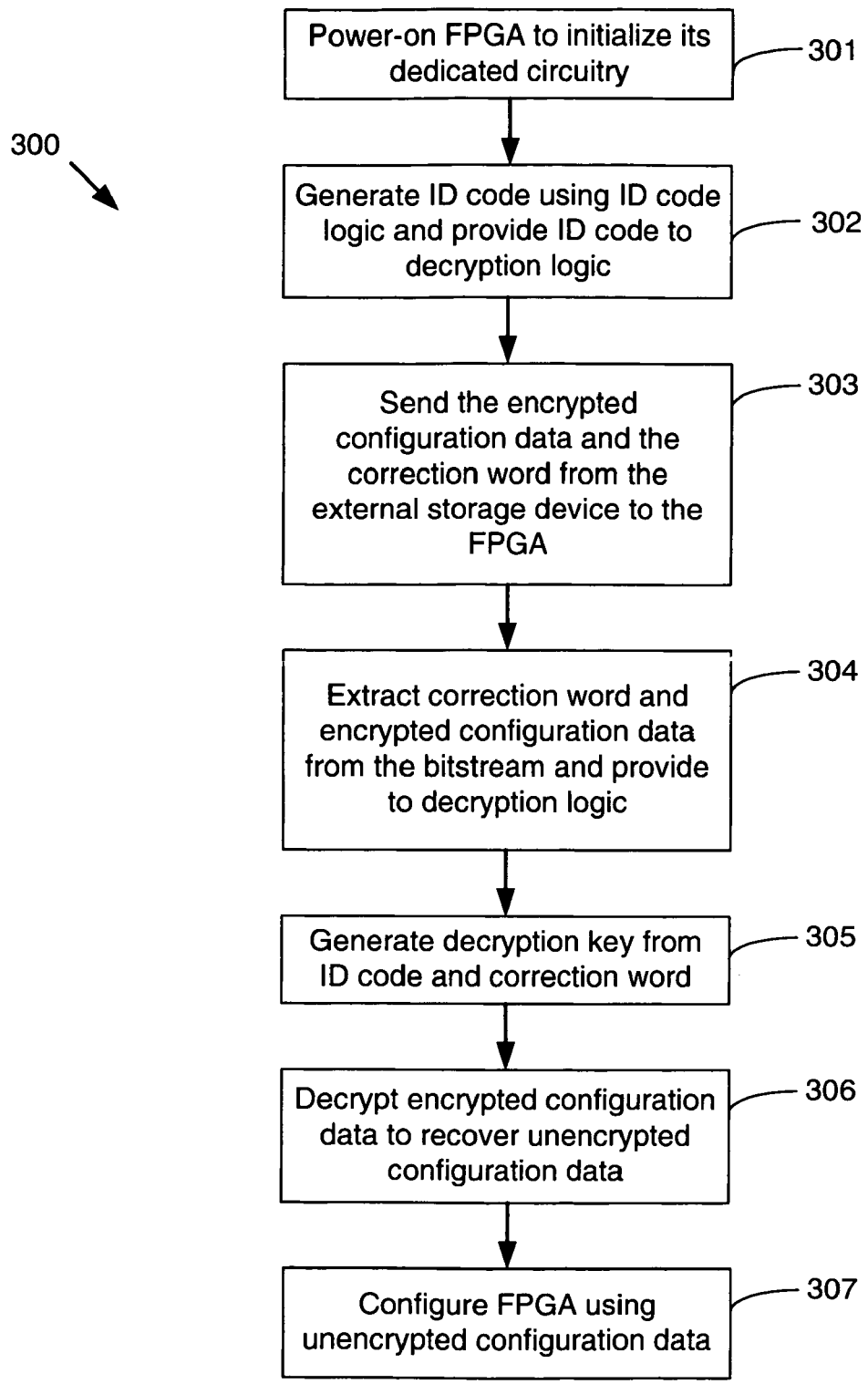
FIG. 3 is an illustrative flow chart depicting an exemplary embodiment of a configuration operation during which encrypted configuration data and the correction word are provided to the FPGA and used to configure the FPGA to implement a desired user design.

FIG. 3 is an illustrative flow chart 300 depicting an exemplary embodiment of the configuration operation of FPGA 110 during which a bitstream including encrypted configuration data and the correction word may be securely transmitted to FPGA 110 from external storage device 130. First, FPGA 110 is powered-on, which as described above initializes the FPGA's dedicated configuration circuit 112, bitstream reader 113, and security circuitry 120 to operational states (step 301). In response thereto, the FPGA's ID code logic 122 re-generates the same ID code (e.g., in the manner described above with respect to FIG. 2), and provides the ID code to decryption logic 121 (step 302). Then, external storage device 130 transmits a configuration bitstream including the encrypted configuration data 131 and the correction word 132 to FPGA 110 (step 303). For some embodiments, the correction word, which indicates the logical relationship between the ID code and the encryption key, may be pre-pended to the encrypted configuration data in the configuration bitstream. For other embodiments, the correction word may be provided after the encrypted configuration data in the configuration bitstream. For still other embodiments, the correction word and the encrypted configuration data may be separately sent to the FPGA 110 during configuration operations.

Note that for some embodiments of the configuration operation depicted in the illustrative flow chart of FIG. 3, external controller 140 is not coupled to FPGA 110 or to external storage device 130, thereby preventing an illegal copier from ascertaining the encryption key and/or the correction word from external controller 140.

The FPGA's bitstream reader 113 receives the configuration bitstream from storage device 130, extracts the correction word (CW) and the encrypted configuration data (ECD) from the bitstream, and provides the correction word and the encrypted configuration data to decryption logic 121 (step 304). In response thereto, decryption logic 121 generates a decryption key (DK) in response to the ID code provided from ID code logic 122 and the correction word extracted from the bitstream by bitstream reader 113 (step 305). For some embodiments, decryption logic 121 may generate the decryption key using a logic XOR function of the re-generated ID code and the correction word. For other embodiments, decryption logic 121 may generate the decryption key using a secure hash function, such as the well-known SHA-1 or SHA256 functions. Of course, for still other embodiments, decryption logic 121 may generate the decryption key from the ID code and the correction word using other suitable logical functions.

Then, decryption logic 121 uses the decryption key to decrypt the encrypted configuration data to recover the original, unencrypted configuration data, and forwards the unencrypted configuration data (CD) to configuration circuit 112 (step 306). Next, configuration circuit 112 configures the FPGA's configurable elements 111 with the unencrypted configuration data to implement the user design in a well-known manner (step 307).

It is to be understood that the configuration operation described above is exemplary, and thus one or more of the process steps depicted in the illustrative flow chart FIG. 3 may be performed in other suitable orders.

In accordance with the present invention, the encryption key used to encrypt the configuration data is not stored in external storage device 130, and is therefore not transmitted to the FPGA 110 during configuration of FPGA 110. As a result, an illegal copier cannot obtain the encryption key by reading data from external storage device 130 or by intercepting the bitstream transmitted from external storage device 130 to the FPGA during configuration operations. Thus, to decrypt the encrypted configuration data stored in and/or transmitted to the FPGA during configuration operations, an illegal copier needs the FPGA's ID code, which as mentioned above is not only unique to the FPGA, but also is not retained in the FPGA when the FPGA is powered-down and is not readable from the FPGA.

Further, by utilizing a correction word that indicates the logical relationship between the encryption key and the FPGA's unique ID code to decrypt the encrypted configuration data provided to the FPGA during configuration operations, embodiments of the present invention allow a customer to use the same encryption key to encrypt configuration data for a plurality of programmable devices (e.g., FPGA 110) that generate different ID codes. This may significantly reduce the time required for the customer to configure a large number of programmable devices and reduce the complexity of the customer's manufacturing flow, since the configuration data only needs to be encrypted once, without compromising the security of the customer's proprietary information embodied in the encrypted configuration data.

For other embodiments, the correction word may be generated in response to (e.g., as a logical combination of) the FPGA's unique ID code, the encryption key, and the user's configuration data. For these other embodiments, external controller 140 may, upon authenticated by the FPGA's security circuit 120, send the configuration data to correction word logic 123 via I/O interface 114 during a set-up operation similar to that described above with respect to FIG. 2. In response thereto, correction word logic 123 may generate the correction word as a logical function of the ID code, the encryption key, and the configuration data, and thereafter output the correction word from FPGA 110 for subsequent storage in external storage device 130. For one embodiment, correction word logic 123 may generate the correction word as a logical combination (e.g., the XOR logic function) of the ID code, the encryption key, and the configuration data. For another embodiment, correction word logic 123 may generate the correction word using another suitable logical combination of the ID code, the encryption key, and the configuration data. For yet another embodiment, correction word logic 123 may generate the correction word using a well-known cryptographic hash function of the ID code, the encryption key, and the configuration data.

For still other embodiments, the correction word generated within FPGA 110 in response to the FPGA's unique ID code and the encryption key provided by the user may be stored in a suitable non-volatile memory element provided within the FPGA. For such embodiments, the correction word need not be read from the FPGA during the set-up operation, and need not be stored in external storage device 130 and/or transmitted to the FPGA during configuration operations.

While particular embodiments of the present invention have been shown and described, it will be obvious to those skilled in the art that changes and modifications may be made without departing from this invention in its broader aspects, and therefore, the appended claims are to encompass within their scope all such changes and modifications as fall within the true spirit and scope of this invention.

What is claimed is:

1. A method of securing configuration data for an integrated circuit (IC), the method comprising:
  encrypting the configuration data using an encryption key to generate encrypted configuration data;
  generating an identification (ID) code in the IC, wherein the ID code is derived from a silicon fingerprint of the IC;
  generating a correction word that is based on the ID code and the encryption key, wherein the correction word is unique to the IC and allows the same encryption key to be used to encrypt the configuration data for other ICs that generate different ID codes; and
  storing the encrypted configuration data and the correction word in an external storage device coupled to provide the encrypted configuration data to the IC,
  wherein the ID code and the encryption key are not stored in the external storage device.

2. The method of claim 1, wherein the correction word is generated in response to the ID code, and the encryption key, and the configuration data.

3. The method of claim 1, wherein at least one of the group consisting of the ID code, the correction word, and the encryption key is not retained in the IC when the IC is powered-off.

4. The method of claim 1, further comprising:
  authenticating an external controller to exchange data with the IC; and
  selectively enabling the generating the correction word in response to the authenticating.

5. The method of claim 1, further comprising:
  during a configuration operation:
    re-generating the ID code in the IC;
    transmitting the encrypted configuration data and the correction word to the IC from the external storage device;
    generating, in the IC, a decryption key in response to the ID code and the correction word; and
    decrypting the encrypted configuration data using the decryption key.

6. The method of claim 5, wherein the encryption key is not transmitted to the IC during the configuration operation.

7. The method of claim 1, wherein the IC is a programmable logic device.

8. A method of securing configuration data for a plurality of integrated circuits (ICs), the method comprising:
  encrypting the configuration data using an encryption key to generate encrypted configuration data;
  for each IC of the plurality of ICs:
    generating an identification (ID) code in the IC, wherein the ID code is derived from a silicon fingerprint of the IC;
    sending the encryption key to the IC;
    within the IC, generating a correction word that is based upon the encryption key and the IC's ID code, wherein the correction word is unique to the IC and the correction word allows the same encryption key to be used to encrypt the configuration data for other of the plurality of ICs that generate different ID codes; and
    storing the encrypted configuration data and the correction word in an external storage device coupled to provide the encrypted configuration data to the IC,
  wherein the ID code and the encryption key are not stored in the external storage device.

9. The method of claim 8, wherein each IC of the plurality of ICs does not retain at least one of the group consisting of the encryption key, the ID code, and the correction word when the IC is powered-down.

10. The method of claim 8, further comprising, for at least one IC of the plurality of ICs:
  during a configuration operation of the IC:
    re-generating the ID code in the IC;
    transmitting the encrypted configuration data and the corresponding correction word to the IC;
    generating, in the IC, a decryption key in response to the IC's ID code and the corresponding correction word; and
    decrypting the encrypted configuration data using the decryption key.

11. The method of claim 8, wherein generating the correction word that is based upon the encryption key and the IC's ID code comprises generating the correction word by logically combining the encryption key and the ID code.

12. The method of claim 11, wherein generating the correction word by logically combining the encryption key and the ID code comprises generating the correction word by exclusively-ORing the encryption key and the ID code.

13. A system for protecting proprietary data from an unauthorized user, the system comprising:
  an external storage device for storing encrypted proprietary data and a correction word, wherein the proprietary data is encrypted using an encryption key; and
  an integrated circuit (IC) coupled to receive the encrypted proprietary data from the external storage device, the IC comprising:

an identification (ID) code circuit for generating an ID code that is unique to the IC, wherein the ID code is derived from a silicon fingerprint of the IC;

a correction word circuit for generating the correction word in response to the ID code and the encryption key, wherein the correction word is based upon the ID code and the encryption key, wherein the correction word is unique to the IC, and the correction word allows the same encryption key to be used to encrypt the configuration data for other ICs that generate different ID codes; and a decryption circuit for generating a decryption key in response to the ID code and the correction word, wherein the decryption key is used to decrypt the encrypted proprietary data, wherein the ID code and the encryption key are not stored in the external storage device.

14. The system of claim 13, further comprising:

an external controller for providing the encryption key to the IC and for receiving the correction word from the IC during a set-up operation.

15. The system of claim 14, wherein the IC further comprises:

an authentication circuit for selectively enabling the external controller to exchange data with the IC during the set-up operation.

16. The system of claim 13, wherein the Identification code circuit, the correction word circuit, and the decryption circuit are implemented using dedicated logic.

17. The system of claim 13, wherein the IC is a programmable logic device (PLD), and the PLD further comprises:

a plurality of configurable elements programmable by the proprietary data to implement a user design.

18. The method of claim 1, wherein generating the correction word that is based on the ID code and the encryption key comprises generating the correction word by logically combining the ID code and the encryption key.

19. The method of claim 18, wherein generating the correction word by logically combining the ID code and the encryption key comprises generating the correction word by exclusively-ORing the ID code and the encryption key.

* * * * *